July 16, 1963 E. W. JETT 3,097,759
SEED DISPENSING DEVICE
Filed June 15, 1961
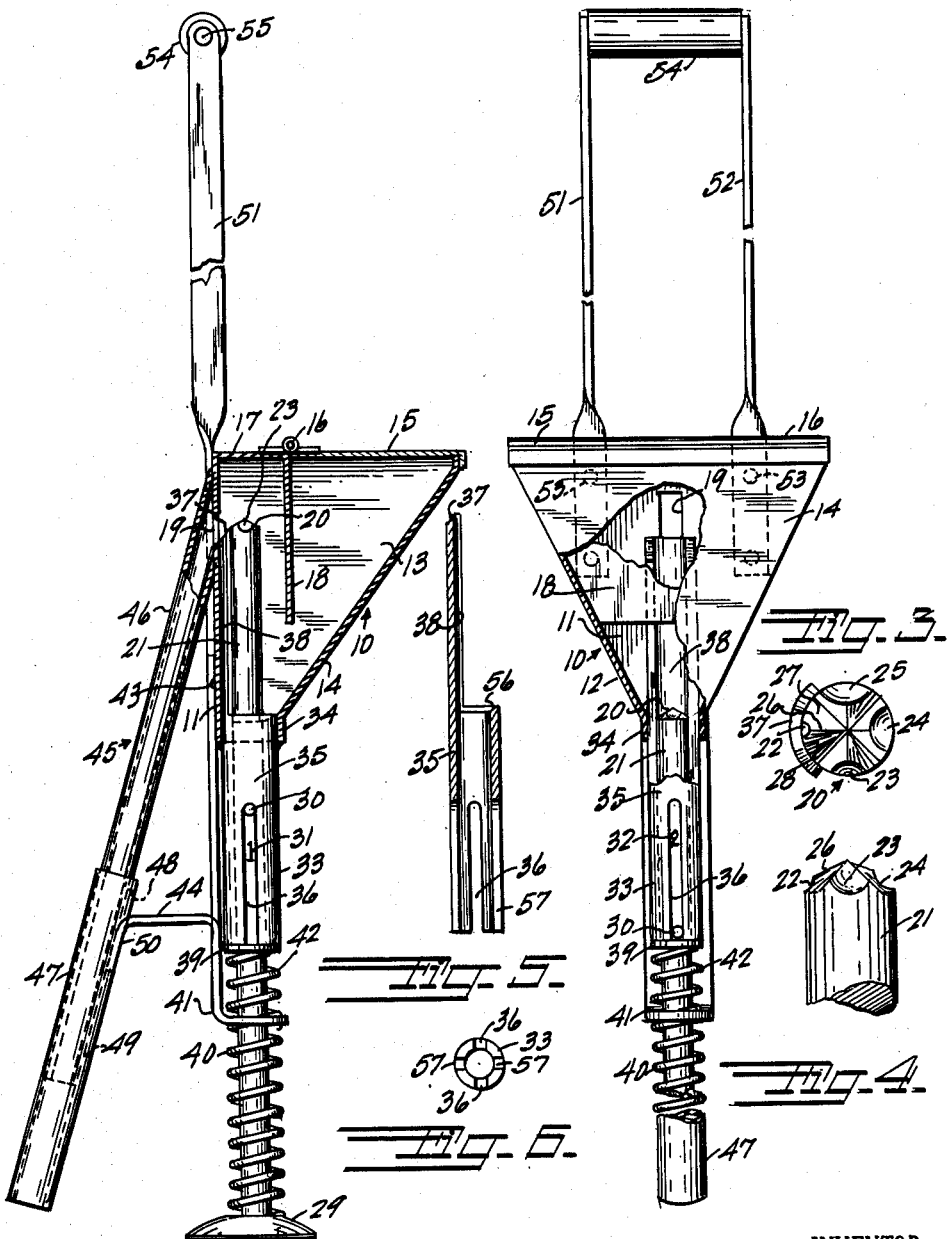
INVENTOR.
Ernest W. Jett
BY Philip A. Friedell
Attorney

United States Patent Office 3,097,759
Patented July 16, 1963

3,097,759
SEED DISPENSING DEVICE
Ernest W. Jett, Santa Rosa, Calif.
Filed June 15, 1961, Ser. No. 117,311
3 Claims. (Cl. 221—190)

This invention relates to improvements in seed dispensing devices, and particularly to hand operated planters, and provides a planter which through a simple adjustment can be made to dispense single seeds of various sizes or a plurality of seeds with each operation, adjustment and operation being very simple.

This planter has an upwardly extending handle, and a foot which is normally projected, depression of the handle against the resilient resistance of the foot, causing one or several seeds to be delivered to a chute which deposits the seed or seeds in a position somewhat removed from the position occupied by the foot.

The objects and advantages of the invention are as follows:

First, to provide a hand planter which will selectively dispense one or a plurality of seeds with each operation.

Second, to provide a planter as outlined which is adjustable at will for dispensing single or a plurality of any specific size of seeds.

Third, to provide a planter as outlined which through a single depression on the handle will dispense the selected size and number of seeds.

Fourth, to provide a planter as outlined which is simple in construction, quickly and easily adjusted for desired seed dispensing, easy and convenient to operate, and economical to manufacture.

In describing the invention reference will be had to the accompanying drawings, in which:

FIG. 1 is a side elevation of the invention shown partly in section, and in seed dispensing position.

FIG. 2 is a front elevation of FIG. 1 with a portion broken away and partly in section, with the seed dispensing element retracted.

FIG. 3 is a top plan view of the selective seed dispenser.

FIG. 4 is a fragmentary elevational view of the seed dispenser.

FIG. 5 is a sectional elevation through the dispenser guide and indexing means.

FIG. 6 is a bottom plan view of FIG. 5.

The invention consists of a seed hopper, a normally retracted selective seed dispenser, normally projected foot, a seed chute, and a handle for hand operation.

The hopper 10 is preferably made with a straight back wall 11 and sloping side walls 12 and 13 and front wall 14, being substantially the conventional form for hoppers, and is provided with a cover or lid 15 which is hinged at 16 to a top wall 17, the actual difference residing in the baffle 18 which extends well down inside the hopper to keep the seed from rising to a level where it can escape through the dispensing passage 19 provided in the back wall at the upward terminal of travel of the dispenser 20.

The dispenser 20 constitutes the top end of a plunger 21, and is provided with a plurality of different size recesses, one of which is very small as indicated at 22 for very small seeds such as lettuce and various flower seeds, another being somewhat larger as indicated at 23, with the others still increasingly larger as indicated at 24 and 25, the latter being suitable for pumpkin, corn, and similar seeds, or a plurality of smaller seeds. The recess 22 may be made of proper size for one or several tiny seeds, and if more are to be dispensed through each operation, the next larger size may be used. Thus providing accurate dispensing of seeds as may be desired or required.

A ridge 26 is formed at the axis of each recess with the walls sloping in each direction as indicated at 27 and 28 for the rejection of excess seeds.

The plunger 21 is uniform in diameter throughout its height and has a foot 29 secured on its lower end, and a guide and indexing pin 30 diametrically secured intermediate its length, this guide pin also serving as a stop. The plunger is also provided with indices as indicated at 31 and 32, to indicate the dispensing recess which is in position.

The indexing guide 33 is secured in the lower end of the hopper as indicated at 34 and consists of a bushing portion 35 the lower end of which is diametrically slotted as indicated at 36 to a depth slightly greater than the required travel of the plunger, and so located and terminated as to maintain the respective dispensing recesses in proper registry for the discharge passage 19, and to function as a stop through cooperation with the pin 30 when the dispensing recesses clear the top edge 37 of the guide portion 38, with the lower end of the slot permitting the pin to retract to the washer 39 which functions as a stop for the plunger when retracted by the compression spring 40 which cooperates between the foot 29 and the bracket 41; a second compression spring 42 cooperating between the bracket and the lower end of the bushing portion or washer 39.

The bracket 41 may be fixed to the bushing 35 or to the back wall of the hopper as indicated at 43, and this bracket has a portion formed outwardly as indicated at 44 to form a support for the chute 45 which consists of a tubular member 46 which is secured at its upper end to the upper end of the back wall 11 with the discharge passage 19 opening thereinto. This chute has an extension 47 which is slidable on the tubular member, and is slotted from a point 48 to a point 49 for sliding movement relative to the downturned portion 50 of the bracket.

A suitable handle is provided and may consist of a single staff or as shown, a pair of staffs 51 and 52 which are fixed to the back wall 11 at their lower ends as shown at 53, and with a transverse handle 54 spacing the staffs and pivoted therebetween as indicated at 55.

It will be noted that the upper end of the bushing portion is inwardly beveled as indicated at 56, and the guide portion 38 may be formed integral with the bushing portion, formed separately and mounted on the back wall, or the back wall may be formed in to provide the guide for the dispenser.

If only two sizes of dispensing cavities are to be provided, only one diametric slot 36 is required, however, if two diametric slots are provided, as indicated at 36 and another 57 at right angles thereto, four different sizes of dispensing cavities may be provided as indicated in FIGS. 3 and 4.

The foot 29 is normally projected by the spring 40, with the guide pin 30 in the position indicated in FIG. 2, with the dispensing cavities below or in registry with the lower edge of the bevel 56, and therefore capable of dispensing the very last of the seeds in the hopper.

The cover 15 is lifted for filling the hopper with seed, the baffle 20 preventing overfilling or accidental overflow through the discharge passage. The cover is closed, and with the plunger adjusted for the desired dispensing cavity, and which is done by retracting the plunger against the tension of the spring 42 until the pin 30 is below the bottom of the bushing portion and rotating the plunger to the proper position and releasing, the planter is ready for use.

For operation, the planter is moved to the desired position and the handle depressed which causes retraction of the foot and advancement of the plunger to where the dispensing cavity is in registry with the discharge passage with the seed or seeds discharged through the chute to the soil.

Thus a planter is provided with adjustable means for individually dispensing seeds of different sizes, or a desired number of seeds with each operation.

I claim:

1. A seed dispensing device including a receptacle having a lower end, and having an upper end having a wall having a dispensing passage formed therethrough, a plunger operable through the lower end with the receptacle manually depressable thereon, and including spring means for returning the plunger to its normal position, and a plurality of angularly spaced dispensing cavities formed in the upper end of the plunger and being selectively registrable with the dispensing passage, indexing means comprising a bushing having its upper end fixed in the said lower end of the receptacle and extending therebelow, and with the said plunger slidable therein, angularly spaced slots formed upwardly from the lower end of said bushing, a pin radially projecting from said plunger and selectively slidable in said slots, the upper end walls of the slots forming stops for cooperation with the pin for limiting depression of the receptacle on the plunger, a washer normally seated against the lower end of said bushing and normally cooperative with said pin, a bracket depending from said lower end of said receptacle and spaced therebelow and having a plunger receiving passage and resilient means cooperative between said washer and said bracket for normally retaining the pin within the selected slots, manual retraction of the plunger against the urgence of said resilient means retracting the pin with the cooperative washer to a position clearing the lower end of the bushing to provide for rotative adjustment of the plunger for selective registry of another cavity with the dispensing passage.

2. A seed dispensing device having a receptacle having a lower end and an upper wall having a seed dispensing passage and having a plunger operable through said lower end, with the receptacle manually depressable thereon, and including spring means for returning the receptacle to its normal position on the plunger, selective feeding means comprising a plurality of different size angularly spaced seed dispensing cavities formed in the upper end of said plunger, a bushing having its upper end fixed in said lower end of said receptacle and extending therebelow and having said plunger slidable therein, and having slots having upper terminal walls and formed upwardly from its lower end, a pin fixed in the side of said plunger and selectively slidable in said slots, and thereby providing a stop cooperative with said upper terminal walls for limiting depression of the receptacle on the plunger, a bracket depending from the lower end of said receptacle and spaced therebeneath and having a passage for the plunger, a washer normally seated on the lower end of said bushing and normally cooperative with said pin and with the plunger and resilient means cooperative between the washer and the bracket for retaining the pin within the selected slot, manual retraction of the plunger against the urgence of the resilient means retracting the pin from the lower end of the selected slot to provide for adjustment of the pin to another slot for selection of a different cavity.

3. A seed dispensing device having a plunger having an upper end and a lower end, and a hopper having a lower end having a bushing slidable on said plunger and having a dispensing passage formed through one wall thereof, selective dispensing means comprising a circular series of increasing volume dispensing cavities formed in the upper end of said plunger, the plunger being rotatably adjustable to selected positions for alignment of a selected cavity with the dispensing passage, indexing means including means releasably maintaining the adjusted position of the plunger and including said bushing with its upper end fixed in said lower end of said hopper and extending therebelow, and having a circular series of slots formed upwardly from the lower end thereof and terminating in an end wall, said plunger having a radial pin slidable selectively in said slots for cooperation with the end wall to function as a stop for limiting movement of the plunger in the bushing and simultaneously operate as guiding means and means releasably maintaining the adjusted position of the plunger comprising a washer normally seated on the lower end of the bushing a bracket depending from said lower end of the hopper and spaced therebeneath and having a passage for the plunger and resilient retaining means cooperative between the washer and the bracket for retaining the pin in the selected slot, manual retraction of said plunger against the urgence of said resilient means retracting said pin from the selected slot to permit rotative adjustment of the plunger to another slot for selection of a different dispensing cavity.

References Cited in the file of this patent

UNITED STATES PATENTS

| | | |
|---|---|---|
| 591,216 | Griffin | Oct. 5, 1897 |
| 742,377 | Ayers et al. | Oct. 27, 1903 |
| 1,020,758 | Hillyard | Mar. 19, 1912 |
| 1,113,425 | Flinder | Oct. 13, 1914 |
| 2,507,186 | Schneider | May 9, 1950 |